(12) United States Patent
Watanabe et al.

(10) Patent No.: US 8,376,781 B2
(45) Date of Patent: Feb. 19, 2013

(54) SOCKET FOR HOLDING ELECTRONIC DEVICE AND FLAME SENSOR

(75) Inventors: Takashi Watanabe, Tokyo (JP); Motonori Futamura, Tokyo (JP); Raita Mori, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 13/246,914

(22) Filed: Sep. 28, 2011

(65) Prior Publication Data

US 2012/0083168 A1 Apr. 5, 2012

(30) Foreign Application Priority Data

Sep. 30, 2010 (JP) ................................. 2010-221357

(51) Int. Cl.
*H01R 13/66* (2006.01)
(52) U.S. Cl. .................................... 439/620.21; 439/913
(58) Field of Classification Search ............. 439/620.01, 439/620.21, 455, 801, 913; 73/753, 756
See application file for complete search history.

(56) References Cited

U.S. PATENT DOCUMENTS

| 7,322,827 | B2 * | 1/2008 | Frawley et al. .................. 439/31 |
| 7,686,651 | B2 * | 3/2010 | Shinjo ....................... 439/620.22 |
| 8,231,406 | B2 * | 7/2012 | Burris et al. ................... 439/578 |
| 8,257,115 | B2 * | 9/2012 | Herring ..................... 439/620.21 |
| 2007/0111572 | A1 * | 5/2007 | Frawley et al. ............... 439/165 |

FOREIGN PATENT DOCUMENTS

JP 2006-78399 A 3/2006

* cited by examiner

*Primary Examiner* — Khiem Nguyen
(74) *Attorney, Agent, or Firm* — Troutman Sanders LLP

(57) ABSTRACT

A recessed portion is provided into which an ultraviolet detecting device is inserted, and a case is provided for holding removably in the state wherein the ultraviolet detecting device is inserted into the recessed portion. A conducting portion is provided that is connected on one end to the electrode portion of the ultraviolet detecting device and wherein the other end is led out from the case. The recessed portion is provided with first through fourth protrusions which insert into grooves that are formed in the ultraviolet detecting device.

6 Claims, 4 Drawing Sheets

US 8,376,781 B2

SOCKET FOR HOLDING ELECTRONIC DEVICE AND FLAME SENSOR

CROSS REFERENCE TO RELATED APPLICATIONS

The present application claims priority under 35 U.S.C. §119 to Japanese Patent Application No. 2010-221357, filed Sep. 30, 2010, which is incorporated herein by reference.

FIELD OF TECHNOLGY

The present invention relates to an electronic device holding socket provided with a protruding portion for controlling a connectable electronic device, and to a flame sensor that is structured using the socket.

BACKGROUND OF THE INVENTION

Conventionally, there has been, for example, that which is disclosed in Japanese Unexamined Patent Application Publication 2006-78399 ("JP '399") as an electronic device holding socket in a state wherein an electronic device can be inserted into a portion thereof. The electronic device holding socket disclosed in JP '399 has a circular recessed portion into which one end portion of an electronic device, formed in a cylindrical shape, can be inserted. The electronic device is provided with a plurality of pin-shaped electrode terminals and a positioning pin on one end portion thereof. A plurality of holes is formed, in the bottom of the recessed portion, into which these electrode terminal pins and the positioning pin are inserted. The electrode terminals that are inserted into these holes are connected electrically to contact terminals within the socket, to connect to a control device, or the like, through conducting portions that have these contact terminals.

In the electronic device holding socket disclosed in JP '399, the positioning pin being inserted into the hole in the socket positions the plurality of electrode terminals in the correct positions, enabling connections with the proper polarities to the contact terminals within the socket.

However, electronic devices such as the ultraviolet detecting device disclosed in JP '399 are often formed so that the terminal electrodes and the positioning pins are in the same place, so as to be able to standardize the socket. Because of this, the conventional electronic device holding socket can be connected, even if the electronic devices are of different types.

In conventional electronic device holding sockets that are structured as described above, problems, such as described below, arise when using a new model of electronic device that, although being functionally identical to an old model, is not compatible in terms of signal levels and type. In order to use the new model of electronic device, which is not compatible with the old model of electronic device, through insertion into a conventional socket, the control device must be swapped to be compatible with the new model of electronic device.

However, because the conventional socket is still used in this way, there is the danger that an old model of electronic device will be installed in the socket in error. In this case, the old model of an electronic device cannot be caused to function properly.

Because of this, there is the need for an electronic device holding socket into which the old model of electronic device cannot be installed, while using a structure wherein the new model of electronic device can be installed.

The present invention is to respond to this need, and the object thereof is to provide an electronic device holding socket wherein it is possible to discriminate between being able to insert or not being able to insert the electronic device, even for electronic devices that have the same arrangement of electrodes, and to provide a flame sensor using the electronic device holding socket.

SUMMARY OF THE INVENTION

In order to achieve such an object, the electronic device holding socket according to the present invention includes a frame having a recessed portion into which is inserted at least a terminal portion wherein an electrode portion is positioned, of an electronic device having an electrode portion on at least one end face, for holding the electronic device removably in the state wherein it is inserted into the recessed portion; and a conducting portion that is connected on one end to the electrode portion of the electronic device and wherein the other end is led out from the case; wherein: a protruding portion that inserts into a housing portion that is formed in the electronic device is provided in the recessed portion.

The present example is an aforementioned invention, wherein: the recessed portion is formed from a circular hole; and the protruding portion is structured from a protrusion provided on the inner peripheral surface of a recessed portion. The present example is an aforementioned invention, wherein: the protruding portion is structured from a protrusion provided on the bottom surface of a recessed portion, which faces a tip end portion of the electronic device. Further, the protruding portion is structured from a plurality of protrusions; and these protrusions are provided at positions that are not rotationally symmetrical when viewed from the opening side of the recessed portion.

The present example includes holes into which a plurality of pin-shaped electrodes of the electronic device is inserted are provided in the recessed portion; and the holes are provided at positions that are compatible with electronic devices of types that are different from that of the electronic device. A flame sensor according to the present example is structured so as to hold an ultraviolet detecting device as an electronic device in an electronic device holding socket according to the examples set forth above, wherein a housing portion is provided on an outer wall surface of a part within the case into which the ultraviolet detecting device is inserted.

The electronic device that is able to be installed in the electronic device holding socket as set forth in the present invention has a housing portion into which the protruding portion is inserted. Consequently, it is possible to provide an electronic device holding socket wherein it is possible to discriminate between being able to insert or not being able to insert the electronic device, even for electronic devices that have the same arrangement of electrodes.

DETAILED DESCRIPTION OF THE INVENTION

An example of the socket for the an electronic device and the flame sensor is explained in detail using FIG. 1 through FIG. 5.

Figure 1:
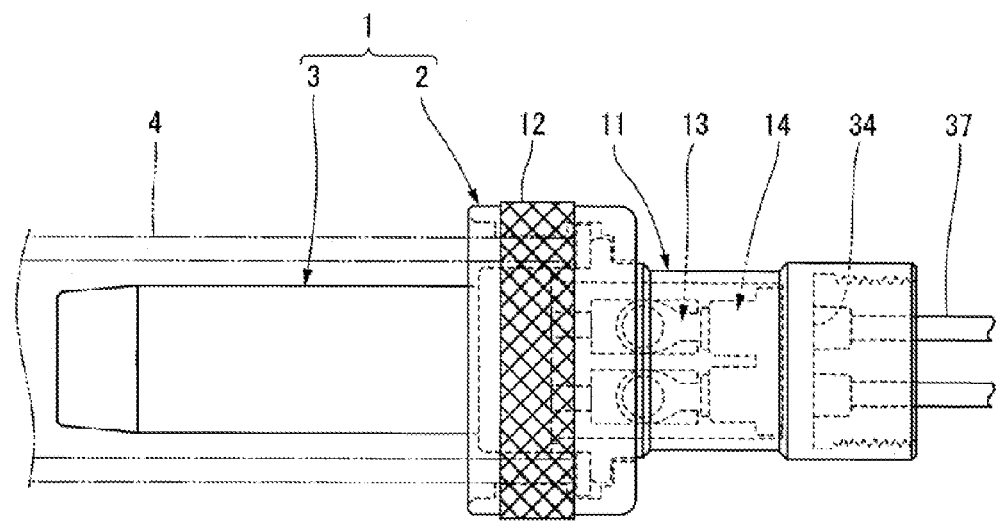
FIG. 1 is a plan view of a flame sensor provided with a socket for holding an electronic device.

The flame sensor illustrated in FIG. 1 is for detecting whether or not there is a flame in a burner in a heating furnace (not shown), where the electronic device holding socket 2 according to the present invention is structured from an ultraviolet detecting device 3 that is mounted in a socket 2. In the present example, the "electronic device" is structured from this ultraviolet detecting device 3. This flame sensor 1 is used in a state wherein it is attached at one end portion of a cylinder 4 that is provided in the heating furnace. When attaching the flame sensor 1 to the cylinder 4, the ultraviolet detecting device 3 is inserted into the cylinder 4.

This cylinder 4 is provided in the wall of the heating furnace so as to face the burner. That is, the flame sensor 1 detects the flame of the burner through the cylinder 4.

Figure 2:
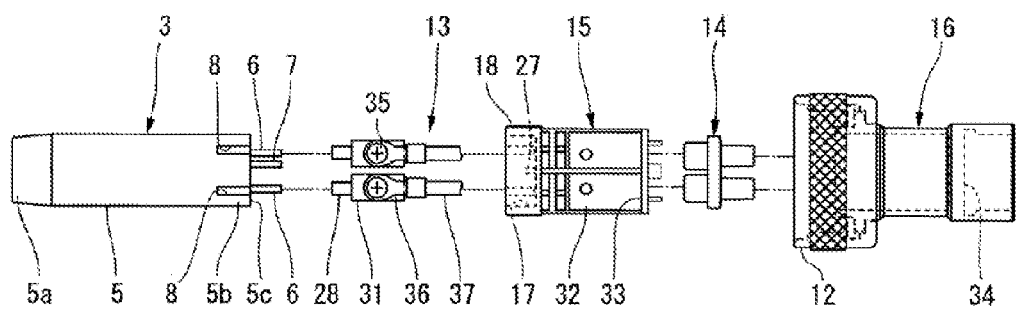
FIG. 2 is a plan view illustrating the disassembled state of the flame sensor.
Figure 3:
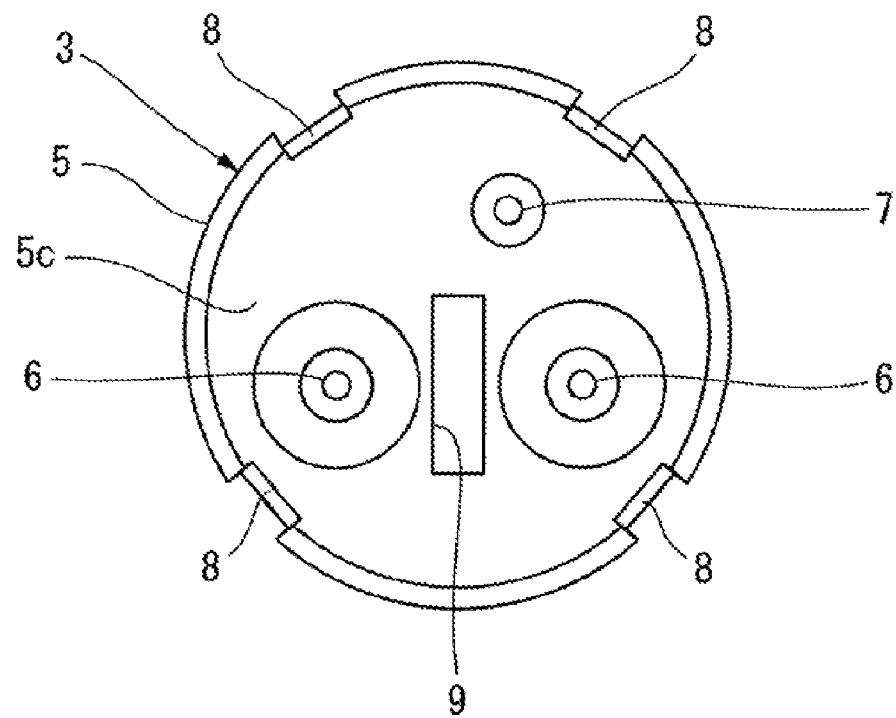
FIG. 3 is a back view illustrating the tip end portion of the ultraviolet detecting device in enlargement.

The ultraviolet detecting device 3, as illustrated in FIG. 2, is formed so that one end portion 5a of a cylindrical rod-shaped main unit 5 is a photosensitive portion. As illustrated in FIG. 3, two pin-shaped electrode terminals 6 and 6, and one positioning pin 7 protrude at the other end portion 5b of the main unit 5. These electrode terminals 6 and positioning pin 7 each extend in parallel to the lengthwise direction of the main unit 5.

Figure 5:
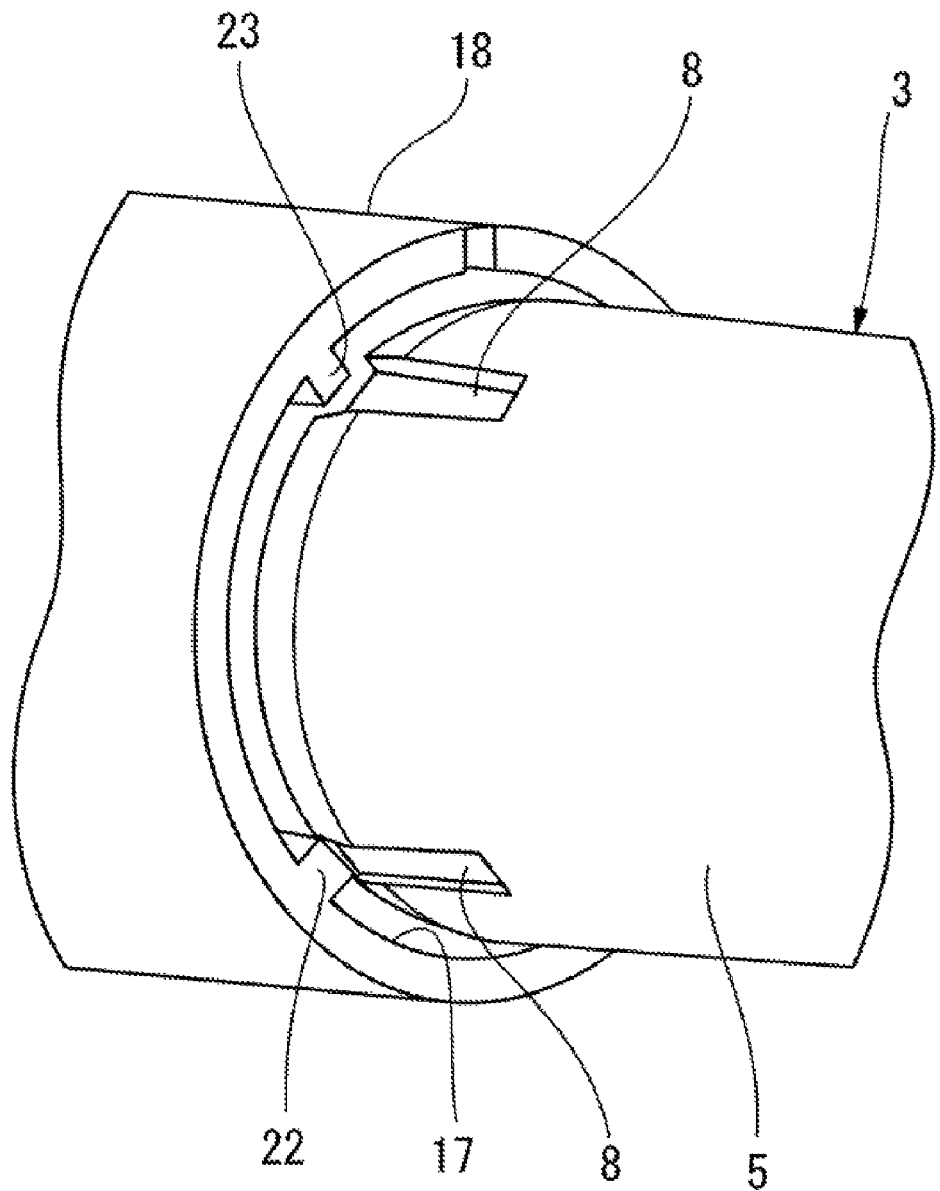
FIG. 5 is a perspective view illustrating a state wherein an ultraviolet sensor is inserted in a socket.

As illustrated in FIG. 3 and FIG. 5, a plurality of grooves 8 is formed on the outer peripheral portion that is the other end portion 5b of the main unit 5. These grooves 8 are formed so as to extend a prescribed length in the direction of the one end portion 5a of the main unit 5 from the tip end face 5c of the main unit 5. Moreover, as illustrated in FIG. 3, a hole 9 having a rectangular opening is formed in the tip end face 5c of the main unit 5. The hole 9 is formed between the two electrode terminals 6 and 6. Additionally, this hole is formed so as to have a prescribed depth in the lengthwise direction of the main unit 5. In the present example, the "housing portion" is structured from this plurality of grooves 8 and the hole 9.

The electronic device holding socket 2, as illustrated in FIG. 1, includes a case 11 for holding the ultraviolet detecting device 3; a nut member 10 for securing the case 11 to the cylinder 4; conducting portions 13 for connecting an electrode terminal 6 of the ultraviolet detecting device 3; and a packing 14, which functions as sealing material for sealing airtightly, by blocking airflow from the inside to the outside of the case 11, that is, from the left end to the right end in the figure.

As illustrated in FIG, 2, the case #11 is structured from a holding member 15 to which the ultraviolet detecting device 3 is connected, and a cylindrical member 16 that covers the holding member 15.

The holding member 15 is formed in a specific shape from plastic that has thermal durability and insulating properties. A recessed portion 17 into which the ultraviolet detecting device 3 fits is formed at one end portion of the holding member 15. An end portion of the ultraviolet detecting device 3, whereon the electrode terminals 6 are positioned, is inserted into the recessed portion 17. The recessed portion 17 is formed by a closed-bottom cylinder 18, structured at one end portion of the holding member 15.

Figure 4:
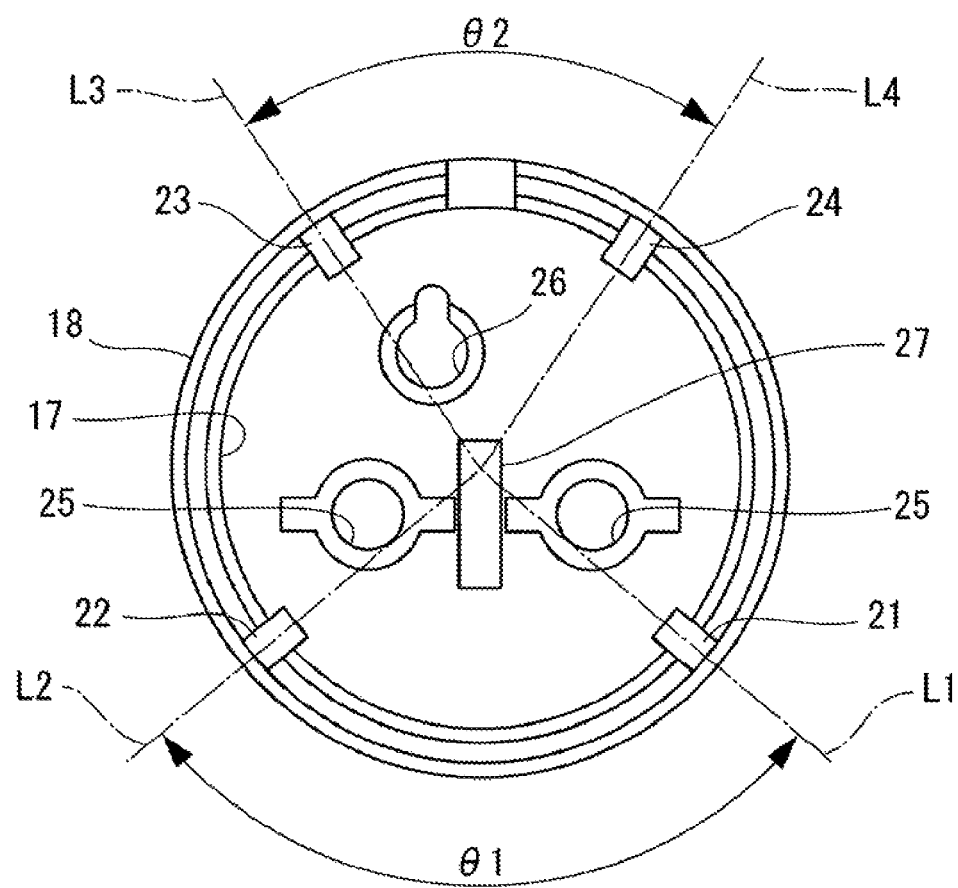
FIG. 4 is a front view illustrating the opening portion of the socket in enlargement.

The inner peripheral portion that is the opening portion of the recessed portion 17 is provided with first through fourth protrusions 21 through 24, as illustrated in FIG. 4. These protrusions 21 through 24 are formed at positions that are separate from each other in the peripheral direction of the closed-bottom cylinder 18. The first through fourth protrusions 21 through 24 as set forth in the present example are provided at positions that are not rotationally symmetrical when viewed from the opening side of the recessed portion 17. In the present example, as illustrated in FIG. 4, an angle θ1 formed by an imaginary line L1 (shown in FIG. 4) that extends from the center of the closed-bottom cylinder 18 through the first protrusion 21 and an imaginary line L2 that extends from the center through the second protrusion 22 is set to 100°. Moreover, the angle θ2 that is formed by the imaginary lines L3 and L4 through the other two protrusions 23 and 24 is set to 70°.

The plurality of grooves 8 that is formed on the outer peripheral portion of the ultraviolet detecting device 3 are formed at positions corresponding to these first through fourth protrusions 21 through 24. The groove widths and lengths, in the lengthwise direction, of the grooves 8 are formed so as to fit with the first through fourth protrusions 21 through 24.

Two types of holes 25 and 26, along with a plate-shaped protrusion 27, are provided at the bottom portion of the recessed portion 17, as illustrated in FIG, 4.

Of these two types of holes 25 and 26, the electrode terminals 6 are inserted into one of these types of holes 25, and the positioning pin 7 is inserted into the other type of hole 26. Contact-type connectors 28 (shown in FIG. 2) for the conducting portions 13, described below, are provided within the holes into which the electrode terminals 6 are inserted. That is, the electrode terminals 6 of the ultraviolet detecting device 3 make contact with the contact-type connectors 28 through being inserted into the holes 25.

The plate-shaped protrusion 27 is positioned between the two holes 25 and 25 into which the electrode terminals 6 are inserted. This protrusion 27 is formed in a position that is off-center, in the radial direction, from the center of the bottom of the recessed portion 17, as illustrated in FIG. 4. The rectangular hole 9 at the tip end face 5c of the ultraviolet detecting device 3 is formed with a size that accommodates the insertion of the plate-shaped protrusion 27 with a loose fit.

In the present example, the "protruding portion" is structured from these first through fourth protrusions 21 through 24 and this plate-shaped protrusion 27.

As illustrated in FIG. 2, a terminal block 32 for supporting a fastening plate 31 for the conducting portions 13 is provided in the center portion, in the lengthwise direction (the left/right direction in FIG. 2) of the holding member 15. An attaching seat 33, for attaching the holding member 15 to the cylindrical member 16, described below, is formed integrally with the other end portion of the holding member 15. This attaching seat 33 cooperates with the dividing wall 34 of the cylinder member 16 to hold the packing 14. The attaching seat 33 is secured to the dividing wall 34 by securing bolts, not shown.

The conducting portions 13, as illustrated in FIG. 2, are structured from contact-type connectors 28 that connect to the electrode terminals 6 of the ultraviolet detecting device 3, fastening plates 31 that are connected to the contact-type connectors 28, press-fit terminals 36 that are connected by the fastening bolts 35 to the fastening plates 31, and cables 37 that are connected to the press-fit terminals 36.

These contact-type connectors 28, fastening plates 31, press-fit terminals 36, and cables 37 are provided in two assemblies, corresponding to the plurality of electrode terminals 6 of the ultraviolet detecting device 3.

The cables 37 lead out to the outside of the case 11 by passing through the attaching seat 33, the packing 14, and the dividing wall 34.

In order to install the ultraviolet detecting device 3 into the electronic device holding socket 2 that is structured in this way, one end portion 5b of the ultraviolet detecting device 3 is inserted into the recessed portion 17 of the socket 2. At this time, the insertion position is determined by rotating the ultraviolet detecting device 3 around the axis (the center line that extends in the lengthwise direction) so that the first through fourth protrusions 21 through 24 on the socket 2 side will be inserted into the grooves 8 of the ultraviolet detecting device 3.

The ultraviolet detecting device 3 that is inserted into the recessed portion 17 advancing to the bottom of the recessed portion 17 causes the electrode terminals 6 and 6 and the positioning pin 7 to be inserted, respectively, into the holes 25 and 26 of the holding member 15. Additionally, at this time the plate-shaped protrusion 27 of the holding member 15 is inserted into the rectangular hole 9 of the ultraviolet detecting device 3. Note that when an ultraviolet detecting device of a different model, wherein the grooves 8 are not formed in the socket 2, is inserted, the first through fourth protrusions 21 through 24 contact the outer peripheral portion of the ultraviolet detecting device, preventing further motion in the inserting direction.

In this case, the only ultraviolet detecting device 3 that can be installed in the electronic device holding socket 2 according to the present example is one wherein the grooves 8 and the rectangular hole 9 are formed. Consequently, given the present example it is possible to provide an electronic device holding socket 2 wherein it is possible to discriminate between being able to insert or not being able to insert the electronic device, even for ultraviolet detecting devices that have the same arrangement of electrodes.

The protruding portion in the present example is structured from the first through fourth protrusions 21 through 24, which are provided on the inner peripheral portion of the recessed portion 17, and the plate-shaped protrusion 27, which is provided at the bottom of the recessed portion 17. However, conversely the recessed portion may be just one of the first through fourth protrusions 21 through 24 and the plate-shaped protrusion 27, for example, may be structured from only the first through fourth protrusions 21 through 24, without providing the plate-shaped protrusion 27, or, may be structured through providing any one of the protrusions, or by providing a combination of two of the protrusions.

Additionally, as can be understood clearly from the description above, there is no limitation to the number of protrusions provided on the inner peripheral portion of the recessed portion 17 being 4, that is, the first through fourth protrusions, but rather the number may be set as appropriate.

If the protruding portion is structured from only the first through fourth protrusions 21 through 24, and electronic device holding socket 2 may be provided wherein the operation for inserting the ultraviolet detecting device 3 can be performed with ease. This is because the plurality of grooves 8 into which the first through fourth protrusions 21 through 24 are inserted is provided on the inner peripheral surface of the ultraviolet detecting device 3, making it possible to insert the ultraviolet detecting device 3 into the recessed portion 17 while visually checking the positioning of the grooves 8.

When the protruding portion is structured from the plate-shaped protrusion 27 alone, the distance along the surface between the electrodes terminals 6 and 6 can be made longer through forming the protrusion 27 so as to have the two electrodes terminals 6 and 6 of the ultraviolet detecting device 3 face each other. Because of this, in this case it is possible to provide an electronic device holding socket 2 with superior insulating performance, while using a structure wherein it is possible to discern whether or not the ultraviolet detecting device 3 can be inserted into the socket 2.

The first through fourth protrusions 21 through 24 as set forth in the example illustrated in FIG. 1 through FIG. 5 are provided at positions that are not rotationally symmetrical when viewed from the opening side of the recessed portion 17. Because of this, it is possible to position the ultraviolet detecting device 3 in the socket 2 through the first through fourth protrusions 21 through 24 and the grooves 8. That is, it is possible to properly position the ultraviolet detecting device 3 in the direction of rotation centered on the axis (the center line that extends in the lengthwise direction) so as to properly insert the plurality of electrodes terminals 6 of the ultraviolet detecting device 3 into the contact-type connectors 28 of the conducting portions 13. Consequently, the present example makes it possible to provide an electronic device holding socket 2 wherein the ultraviolet detecting device 3 is always connected properly.

In the present example, the bottom of the recessed portion 17 is provided with holes 25 and 25 into which the two electrode terminals 6 and 6 of the ultraviolet detecting device 3 are inserted. These holes 25 are provided at positions having compatibility with an ultraviolet detecting device of a model that is different from that of the ultraviolet detecting device 3, that is, an ultraviolet detecting device wherein the grooves 8 and the hole 9 are not provided.

Because of this, the ultraviolet detecting device 3 that can be installed in the socket 2 according to the present example can also be installed in a socket of another model (a socket wherein the protruding portions are not provided), into which the ultraviolet detecting device of the other model can be installed.

A flame sensor 1 according to the present example is structured holding an ultraviolet detecting device 3 as the electronic device in the electronic device holding socket 2. The housing portion (the grooves 8 and the rectangular hole 9) is provided on the outer wall surface of the part of the ultraviolet detecting device 3 that is inserted into the interior of the case 11.

Because of this, the present example makes it possible to provide a flame sensor 1 wherein it is possible to discern whether or not the ultraviolet detecting device 3 can be inserted.

The invention claimed is:

1. An electronic device holding socket, comprising:
   a frame having a recessed portion into which is inserted at least a terminal portion wherein an electrode portion is positioned, of an electronic device having an electrode portion on at least one end face, for holding the electronic device removably in the state wherein it is inserted into the recessed portion; and
   a conducting portion that is connected on one end to the electrode portion of the electronic device and wherein the other end is led out from a case; wherein:
   a protruding portion that inserts into a housing portion that is formed in the electronic device is provided in the recessed portion.

2. The electronic device holding socket as set forth in claim 1, wherein:
   the recessed portion is formed from a circular hole; and
   the protruding portion is structured from a protrusion provided on the inner peripheral surface of a recessed portion.

3. The electronic device holding socket as set forth in claim 1, wherein:
   the protruding portion is structured from a protrusion provided on the bottom surface of a recessed portion, which faces a tip end portion of the electronic device.

4. The electronic device holding socket as set forth in claim 1, wherein:
the protruding portion is structured from a plurality of protrusions; and
these protrusions are provided at positions that are not rotationally symmetrical when viewed from the opening side of the recessed portion.

5. The electronic device holding socket as set forth in claim 1, wherein:
holes into which a plurality of pin-shaped electrodes of the electronic device is inserted are provided in the recessed portion; and
the holes are provided at positions that are compatible with electronic devices of types that are different from that of the electronic device.

6. A flame sensor structured so as to hold an ultraviolet detecting device as an electronic device in an electronic device holding socket as set forth in claim 1, wherein a housing portion is provided on an outer wall surface of a part within the case into which the ultraviolet detecting device is inserted.

* * * * *